United States Patent
Bastianelli et al.

(10) Patent No.: US 11,010,481 B2
(45) Date of Patent: *May 18, 2021

(54) SYSTEMS AND METHODS FOR SECURE DATA TRANSFER BETWEEN ENTITIES IN A MULTI-USER ON-DEMAND COMPUTING ENVIRONMENT

(71) Applicant: salesforce.com, inc., San Francisco, CA (US)

(72) Inventors: Florian Bastianelli, San Francisco, CA (US); Pascal Mercier, Toulouse (FR); Sameer Singhvi, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/050,671

(22) Filed: Jul. 31, 2018

(65) Prior Publication Data

US 2020/0042724 A1    Feb. 6, 2020

(51) Int. Cl.
*G06F 21/60* (2013.01)
*H04L 29/08* (2006.01)
*G06F 16/176* (2019.01)
*G06F 16/907* (2019.01)

(52) U.S. Cl.
CPC .......... *G06F 21/606* (2013.01); *G06F 16/176* (2019.01); *G06F 16/907* (2019.01); *H04L 67/1097* (2013.01)

(58) Field of Classification Search
CPC ...... G06F 8/61; G06F 21/53; G06F 2221/033; G06F 21/00; G06F 21/64

USPC .......................................................... 726/26
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Ernst ("Version control concepts and best practices", 8 pages, Jun. 20, 2016) (Year: 2016).

(Continued)

*Primary Examiner* — Badrinarayanan
*Assistant Examiner* — Badri- Champakesan
(74) *Attorney, Agent, or Firm* — Jaffery Watson Mendonsa & Hamilton LLP

(57) ABSTRACT

Techniques and structures to provide secure data transfer between entities in a multi-user on-demand computing environment. An electronic device may comprise at least one physical memory device, one or more processors coupled with the at least one physical memory device, the one or more processors configurable to create a scratch organization within the computing environment, receive, via a user interface, a metadata selection comprising a plurality of metadata resources which define a set of components for a service implemented in an origin organization of the multi-user, on demand computing environment, extract the plurality of metadata resources from the origin organization within the computing environment into a metadata bundle, and deploy the metadata bundle in the scratch organization. Additional subject matter may be described and claimed.

15 Claims, 11 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,660,423 B2 | 2/2010 | Perlman |
| 8,078,807 B2 | 12/2011 | Saha et al. |
| 9,582,524 B1* | 2/2017 | Murali ................ G06F 16/214 |
| 9,594,904 B1* | 3/2017 | Jain ...................... G06F 21/566 |
| 9,596,291 B1* | 3/2017 | Basva .................. G06F 3/0685 |
| 10,089,676 B1 | 10/2018 | Gupta et al. |
| 10,162,528 B2* | 12/2018 | Sancheti ............. G06F 3/0605 |
| 10,387,291 B2* | 8/2019 | Wunderlich ...... G06F 11/3664 |
| 10,454,902 B2* | 10/2019 | Angelo ............. G06F 9/45558 |
| 10,616,127 B1* | 4/2020 | Suit ..................... G06F 9/5088 |
| 10,871,950 B2* | 12/2020 | De Smet ................ G06F 8/427 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0131084 A1 | 7/2003 | Pizzorni et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0212986 A1* | 11/2003 | Nelin ................ G06F 11/3664 717/124 |
| 2003/0217258 A1 | 11/2003 | Bade |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0195651 A1* | 8/2008 | Rachmiel ............. G06F 21/604 |
| 2009/0177744 A1 | 7/2009 | Marlow et al. |
| 2009/0320109 A1 | 12/2009 | Salada et al. |
| 2011/0078213 A1 | 3/2011 | Bezar et al. |
| 2011/0083122 A1* | 4/2011 | Chen ................. G06F 11/3668 717/124 |
| 2011/0289356 A1 | 11/2011 | Hossain et al. |
| 2012/0054754 A1 | 3/2012 | Teichmann et al. |
| 2012/0254842 A1 | 10/2012 | Henderson |
| 2013/0110939 A1 | 5/2013 | Yang et al. |
| 2013/0117289 A1* | 5/2013 | Fischer ................ G06F 16/214 707/756 |
| 2013/0173669 A1 | 7/2013 | Tang et al. |
| 2013/0262626 A1 | 10/2013 | Bozek et al. |
| 2014/0331310 A1 | 11/2014 | Salada et al. |
| 2014/0337467 A1 | 11/2014 | Pech et al. |
| 2015/0052523 A1* | 2/2015 | Raghu ................ G06F 9/45558 718/1 |
| 2015/0186645 A1* | 7/2015 | Aziz ................... H04L 63/1433 726/23 |
| 2015/0244596 A1* | 8/2015 | Abuelsaad ............ H04L 67/34 709/224 |
| 2015/0295779 A1 | 10/2015 | Ching et al. |
| 2015/0378716 A1* | 12/2015 | Singh ..................... H04W 4/60 717/172 |

(56) References Cited

U.S. PATENT DOCUMENTS

| | | | |
|---|---|---|---|
| 2016/0070555 A1 | 3/2016 | Xiong et al. | |
| 2016/0117388 A1* | 4/2016 | Fan | G06F 16/248 |
| | | | 717/178 |
| 2016/0132805 A1 | 5/2016 | Delacourt et al. | |
| 2016/0259804 A1* | 9/2016 | Subramaniam | G06F 16/168 |
| 2016/0381092 A1 | 12/2016 | Dash et al. | |
| 2017/0075791 A1 | 3/2017 | Ramakrishna et al. | |
| 2017/0075794 A1 | 3/2017 | Ramakrishna et al. | |
| 2017/0075919 A1 | 3/2017 | Bose et al. | |
| 2017/0344353 A1 | 11/2017 | Roy-Faderman et al. | |
| 2018/0027006 A1 | 1/2018 | Zimmermann et al. | |
| 2018/0067844 A1 | 3/2018 | Conti et al. | |
| 2018/0089320 A1 | 3/2018 | Hanson et al. | |
| 2018/0181383 A1* | 6/2018 | Jagannath | G06F 8/60 |
| 2018/0246921 A1* | 8/2018 | Henvy | G06F 16/23 |
| 2018/0278721 A1 | 9/2018 | Wall | |
| 2019/0235895 A1* | 8/2019 | Ovesea | G06F 9/4856 |
| 2020/0042427 A1* | 2/2020 | Bastianelli | H04L 63/12 |
| 2020/0042724 A1* | 2/2020 | Bastianelli | G06F 16/176 |

OTHER PUBLICATIONS

Final Office Action for U.S. Appl. No. 15/716,343 dated Mar. 13, 2019, 25 pages.
Non-Final Office Action for U.S. Appl. No. 15/466,752 dated Dec. 20, 2018, 11 pages.
Non-Final Office Action for U.S. Appl. No. 15/716,349 dated Mar. 4, 2019, 17 pages.
Final Office Action for U.S. Appl. No. 15/466,752, dated Feb. 27, 2020, 14 pages.
Non-Final Office Action for U.S. Appl. No. 15/466,752 dated Oct. 1, 2019, 9 pages.
Non-Final Office Action for U.S. Appl. No. 15/716,343 dated Oct. 22, 2019, 26 pages.
Notice of Allowance for U.S. Appl. No. 15/716,349 dated Aug. 28, 2019, 8 pages.
Final Office Action for U.S. Appl. No. 15/466,752 dated Jun. 7, 2019, 15 pages.
Heroku Dev Center ("CLI Usage", Aug. 2, 2016, 3 pages) (Year: 2016).
Notice of Allowance for U.S. Appl. No. 15/727,273 dated May 3, 2019, 9 pages.
Final Office Action for U.S. Appl. No. 15/716,343 dated Jun. 12, 2020, 29 pages.
Non-Final Office Action for U.S. Appl. No. 16/177,337 dated Jul. 16, 2020, 31 pages.
Non-Final Office Action for U.S. Appl. No. 16/460,039 dated Aug. 10, 2020, 16 pages.
Non-Final Office Action for U.S. Appl. No. 16/701,001 dated Jul. 2, 2020, 13 pages.
Non-Final Office Action for U.S. Appl. No. 15/466,752 dated Oct. 8, 2020, 16 pages.
Non-Final Office Action for U.S. Appl. No. 15/716,343 dated Oct. 20, 2020, 32 pages.
Notice of Allowance for U.S. Appl. No. 16/701,001 dated Nov. 20, 2020, 8 pages.
Final Office Action for U.S. Appl. No. 15/466,752 dated Mar. 19, 2021, 17 pages.
Notice of Allowance for U.S. Appl. No. 16/177,337 dated Jan. 19, 2021, 15 pages.
Notice of Allowance for U.S. Appl. No. 16/460,939 dated Feb. 18, 2021, 9 pages.

* cited by examiner

```
{
"objects":[
{
"name": sObject API Name,
"fields":[
//List of field names related to the sObject
"id",
"name",
...
],
"records":[
//List of sObject records
{
"id": Record Id,
"name": Record Name
},
...
],
"rt_map":[
//RecordType map of the sObject
{
"id": Record Type Id
"name": Record Type Developer Name
},
...
],
"refs":[
//sObject relationship Infos
{
"name": Relationship sObject Name,
"obj": Relationshipt sObject API Name
},
...
},
"stds":[
//Standard Object references
{
"name": Reference Field Name,
"obj": Standard Object Name
},
...
]
},
...
]
}
```

FIG. 6

SYSTEMS AND METHODS FOR SECURE DATA TRANSFER BETWEEN ENTITIES IN A MULTI-USER ON-DEMAND COMPUTING ENVIRONMENT

TECHNICAL FIELD

One or more implementations relate generally systems and methods for secure data transfer between entities in a multi-user on-demand computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

Users of multi-user on-demand computing environments may need to transfer, or port, computing services from a source organization to a destination organization. Such computing services may comprise data and metadata which, in turn, may comprise data descriptor(s), program data, and the like. Accordingly, efficient techniques for secure data transfer such as, e.g., transfer of data and metadata, between entities in a multi-user on-demand computing environment may find utility.

BRIEF DESCRIPTION OF THE DRAWINGS

In the following drawings like reference numbers are used to refer to like elements. Although the following figures depict various examples, one or more implementations are not limited to the examples depicted in the figures.

FIG. 6 is a schematic illustration of a JavaScript Object Notation (JSON) file system according to embodiments.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Figure 1:
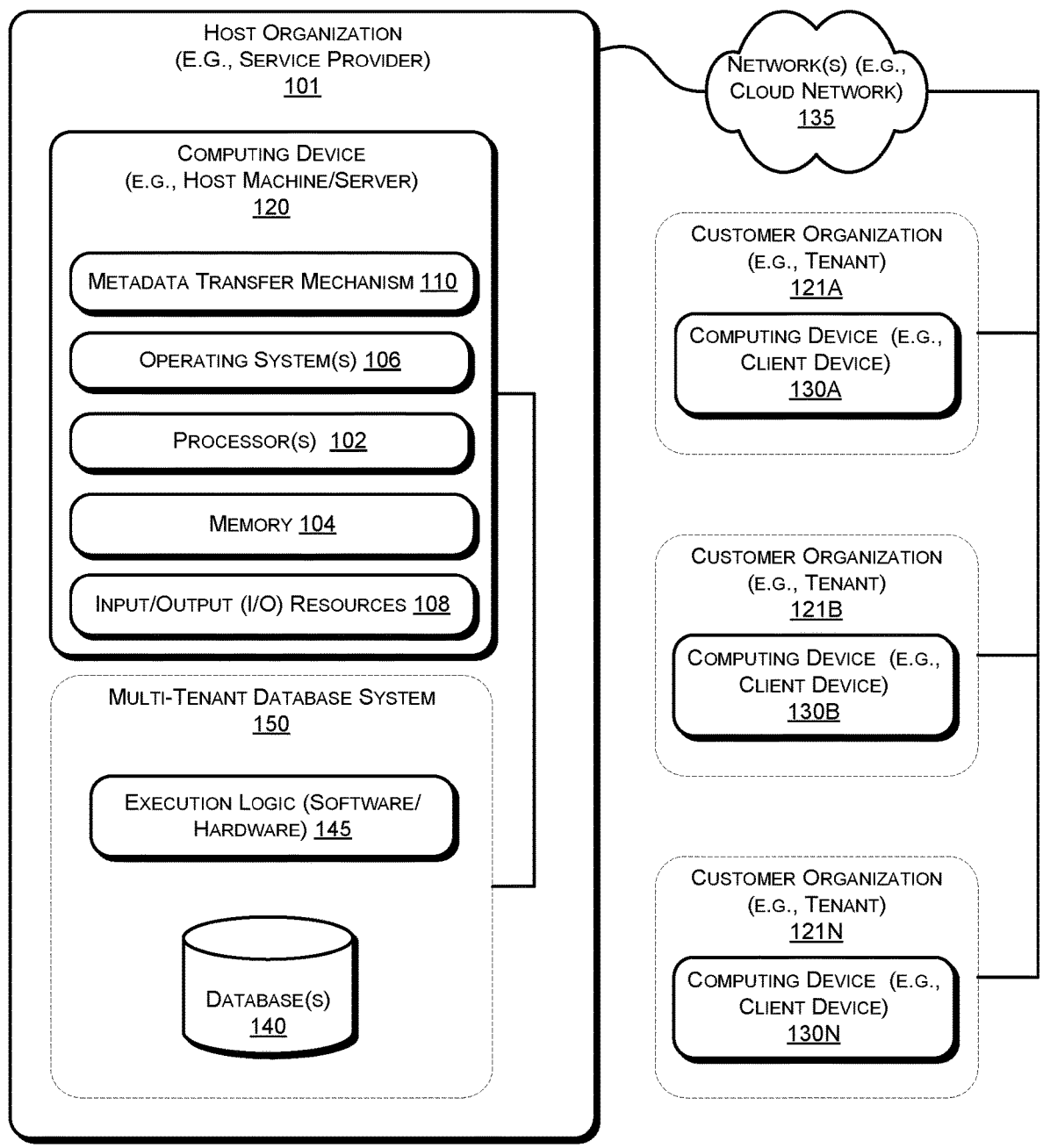
FIG. 1 is a schematic illustration of a processing environment in which systems and methods for secure data transfer between entities in a multi-user on-demand computing system according to embodiments.

FIG. 1 illustrates a system 100 having a computing device 120 employing a metadata transfer mechanism 110 according to one embodiment. In one embodiment, computing device 120 includes a host server computer serving a host machine for employing metadata transfer mechanism 110 for facilitating the secure transfer of metadata between different organizations in a multi-tenant on demand computing environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of metadata transfer mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and execution logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 150 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N may include an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Most applications manipulate data, which is often stored in a database. Examples of such data may include information such as account details or contact information. However, the source code for an application may be considered as a type of data that provides information on how an application looks, feels, and functions. This information may be considered as a form of metadata.

Traditional software development paradigms rely on developers to take code and configuration information, compile, package, and deploy it before users can begin using an application. Various computing platforms, e.g., the Force.com platform, however, deliver Software as a Service (SaaS) and immediately uses the metadata to provide an on-demand application directly in the cloud.

On some multi-user on-demand, e.g., the Force.com platform, metadata defines a set of components including all aspects of functionality, from the appearance of user interfaces through workflow. Examples of components of metadata include custom user interfaces created using Visualforce, generated page layouts, and even Apex classes for custom application functionality. In short, just about every aspect of a Force.com application, ranging from workflows to the configuration of database objects that store data, may be represented as metadata.

As described above, users of multi-user on-demand computing environments may need to transfer, or port, computing services from a source organization to a destination organization. Such computing services may comprise data and metadata which, in turn, may comprise data descriptor (s), program data, and the like. As used herein, the phrase migration pack refers to a combination of metadata and data bundled into one single entity. A migration pack allows content along with its structure to be transferred from an origin organization in a multi-user on-demand computing environment to a destination organization in the multi-user on-demand computing environment. A migration pack is a one-to-many solution that allows deploying a metadata and data bundle previously created as many times as necessary.

Figure 2:
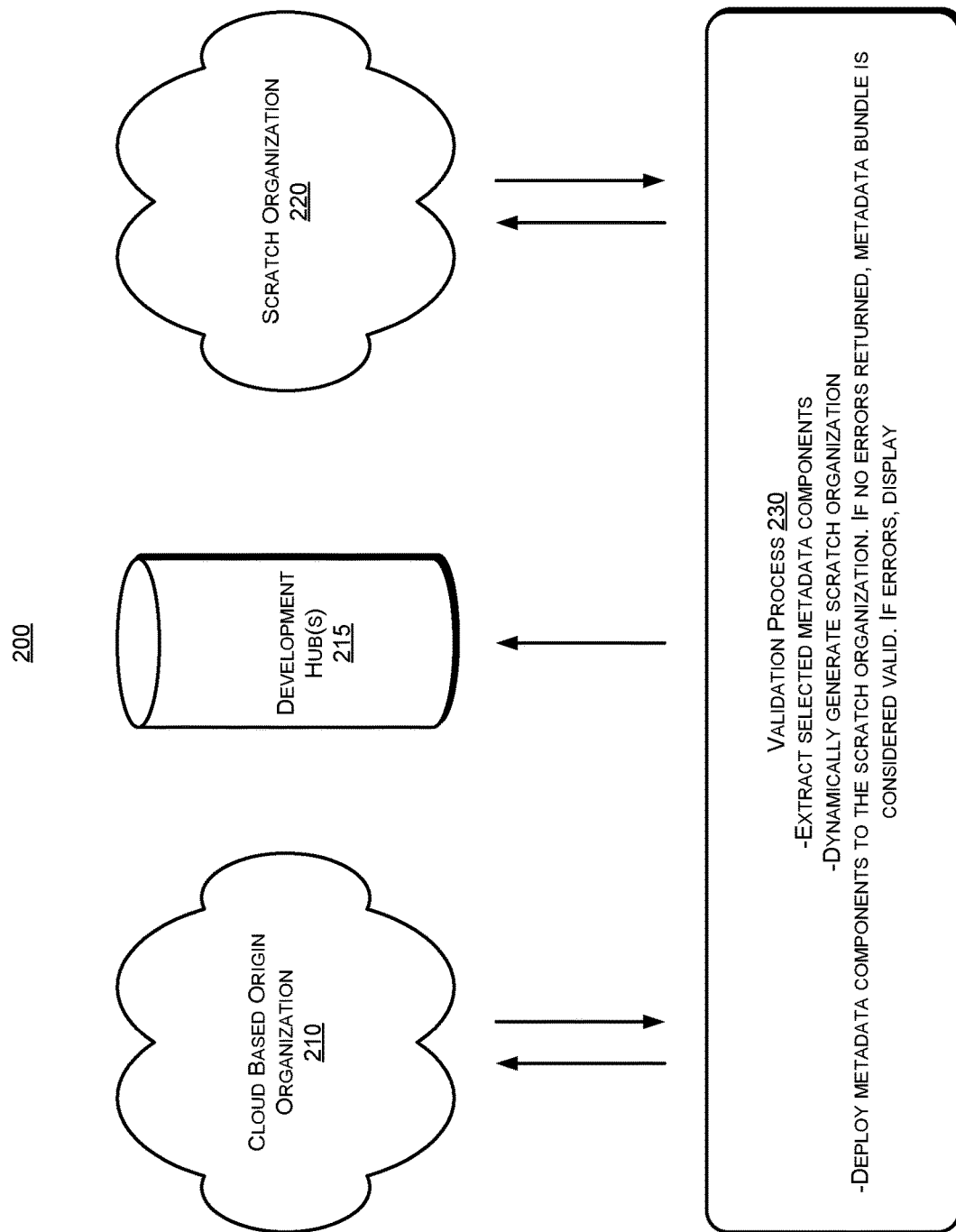
FIG. 2 is a schematic illustration of a processing environment in which systems and methods for secure data transfer between entities in a multi-user on-demand computing system according to embodiments.

FIG. 2 is a schematic illustration of a processing environment in which systems and methods for secure data transfer between entities in a multi-user on-demand computing system according to embodiments. Referring to FIG. 2, in some examples the environment 200 may comprise a cloud based origin organization 210, a development hub 215, and a scratch organization 220. In some examples the entire environment 200 may exist within a multi-user on demand computing environment such as the Salesforce-.com® environment. A validation process 230 executes within the environment 200. In some examples the validation process 230 may execute as one component of the metadata transfer mechanism 110 which executes on a computing device 120.

Figure 3:
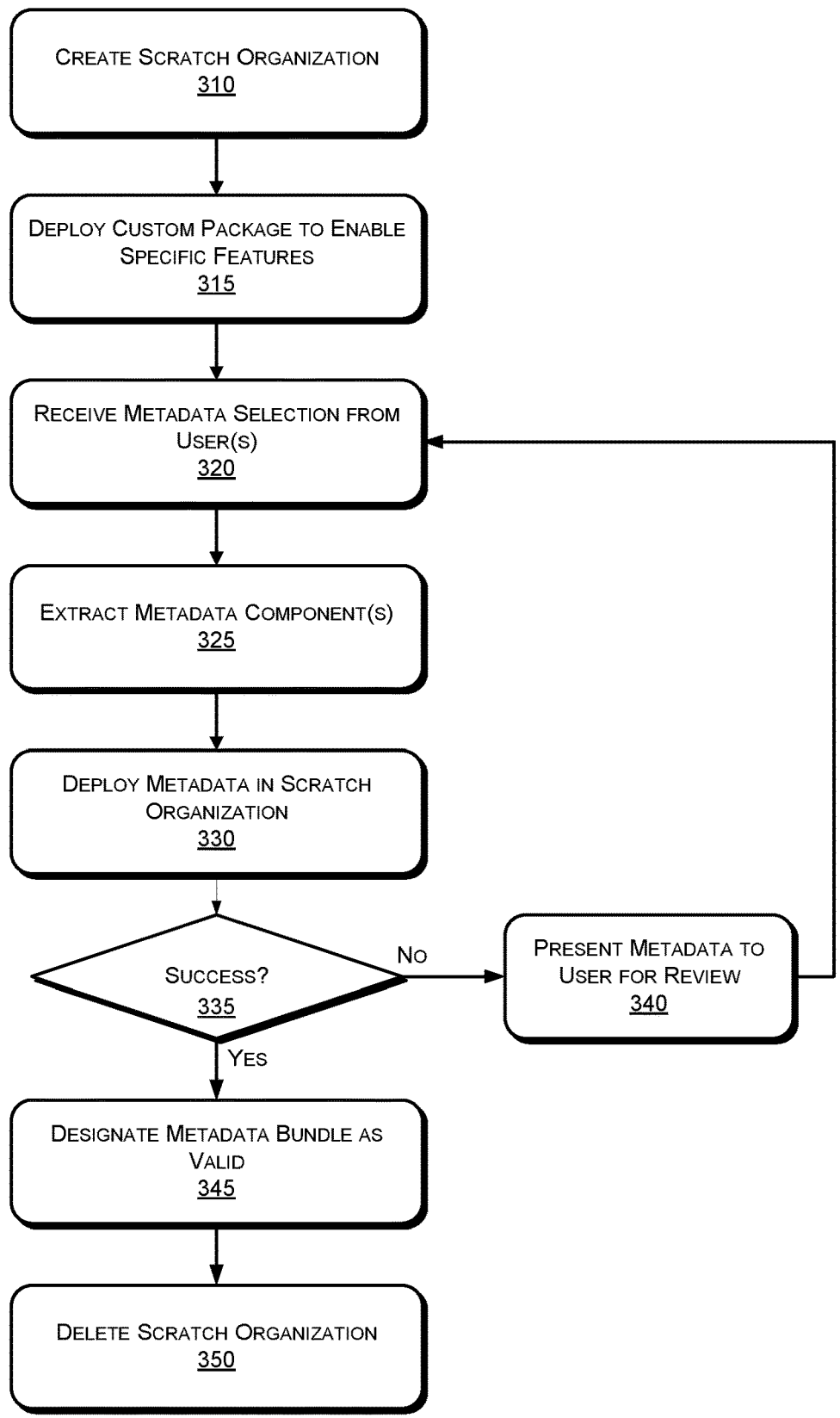
FIG. 3 is a flow diagram which illustrates operations in a method for secure data transfer between entities in a multi-user on-demand computing system according to embodiments.

FIG. 3 is a flow diagram which illustrates operations the validation process 230. The operations depicted in FIG. 3 may be performed by processing logic that may comprise hardware (e.g., circuitry, dedicated logic, programmable logic, etc.), software (such as instructions run on a processing device), or a combination thereof. In one embodiment, the operations depicted in FIGS. 3-4 may be performed or facilitated by one or more components of the metadata transfer mechanism 110 which executes on a computing device 120 depicted in FIG. 1. The operations depicted in FIG. 3 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Referring to FIG. 3, at operation 310 a scratch organization 220 is created in the environment 200. In some embodiments, the scratch organization may be generated dynamically by the development hub(s) 215 and may function as a proxy for a destination organization for metadata deployment in order to allow the various metadata components to be validated. In some examples a scratch organization may comprise source-driven and disposable deployments of code which can be used to drive development, testing, and continuous integration. Code can be tested in a scratch organization and, once the any changes to the code are validated the code can be immediately tested and promoted.

At operation 315 a custom package may be deployed to enable one or more specific features of the application that is being transferred. At operation 320 a metadata selection is received from one or more users of the environment. In some examples the selections may be made from a metadata application programming interface (API) (e.g., the Salesforce Metadata API) accessible to the user. The API may present custom object definitions and page layouts for an organization. This API is intended for managing customizations and for building tools that can manage the metadata model, not the data itself. To create, retrieve, update or delete records, such as accounts or leads, the data SOAP API or REST API may be used.

At operation 325, the metadata components identified in operation 320 are retrieved from the origin organization 210. In some embodiments the metadata components, including any XML files, may be stored in a folder at the application level.

At operation 330 the metadata components are deployed in the scratch organization, and the resulting job status is polled until completion to determine whether the deployment was successful. If, at operation 335, the deployment was not successful then control passes to operation 340 and the metadata selections are presented for the user(s) to review, e.g., via the Metadata API as described above, and control then passes back to operation 320. Thus, operations 320 through 340 define a loop pursuant to which a user may repeatedly select metadata components for transfer, deploy the metadata components in the scratch organization 220, and evaluate the metadata components validity in the scratch organization 220.

By contrast, if at operation 335 the deployment of the metadata resources was successful then control passes to operation 345 and the metadata bundle deployed in the scratch organization 220 is designated as valid. At operation 350 the scratch organization may be deleted.

Figure 4:
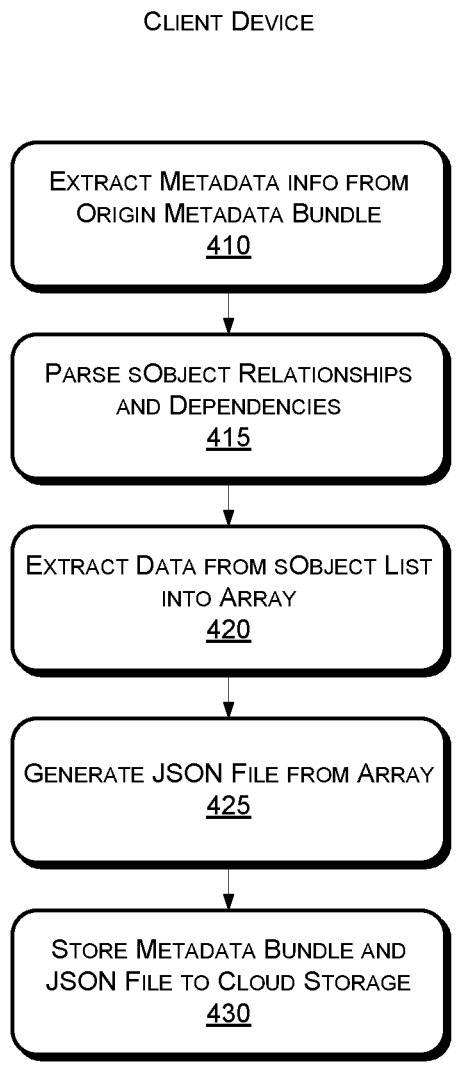
FIG. 4 is a flow diagram which illustrates operations in a method for secure data transfer between entities in a multi-user on-demand computing system according to embodiments.
Figure 5A:
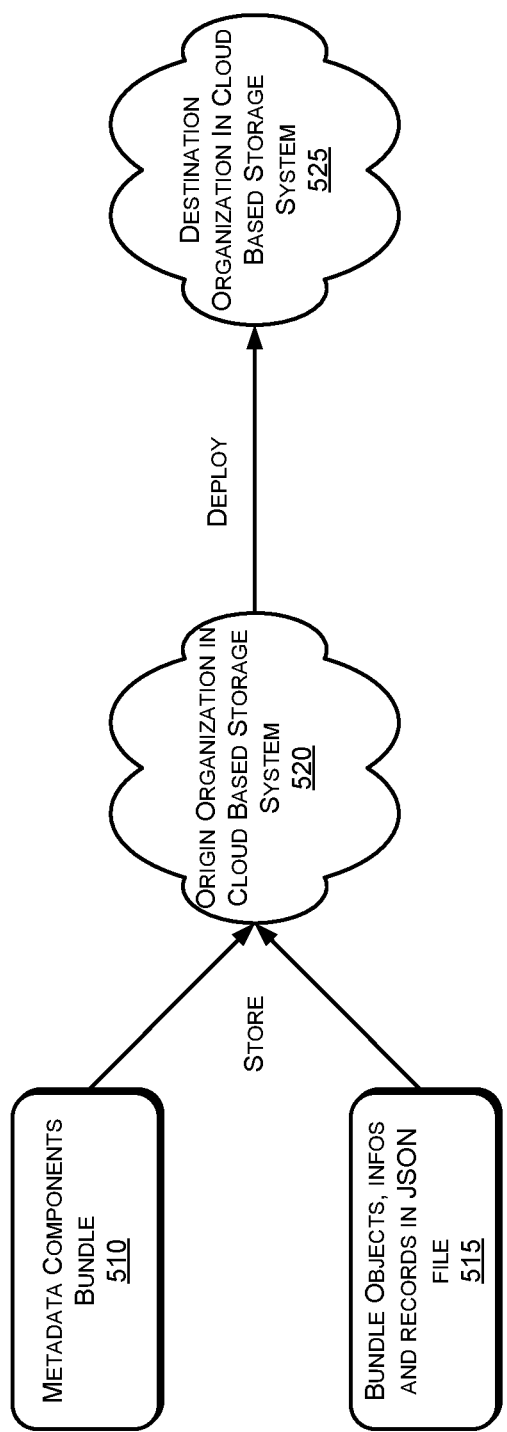
FIGS. 5A-5B are schematic illustrations of a processing environment in which systems and methods for secure data transfer between entities in a multi-user on-demand computing system according to embodiments.
Figure 5B:
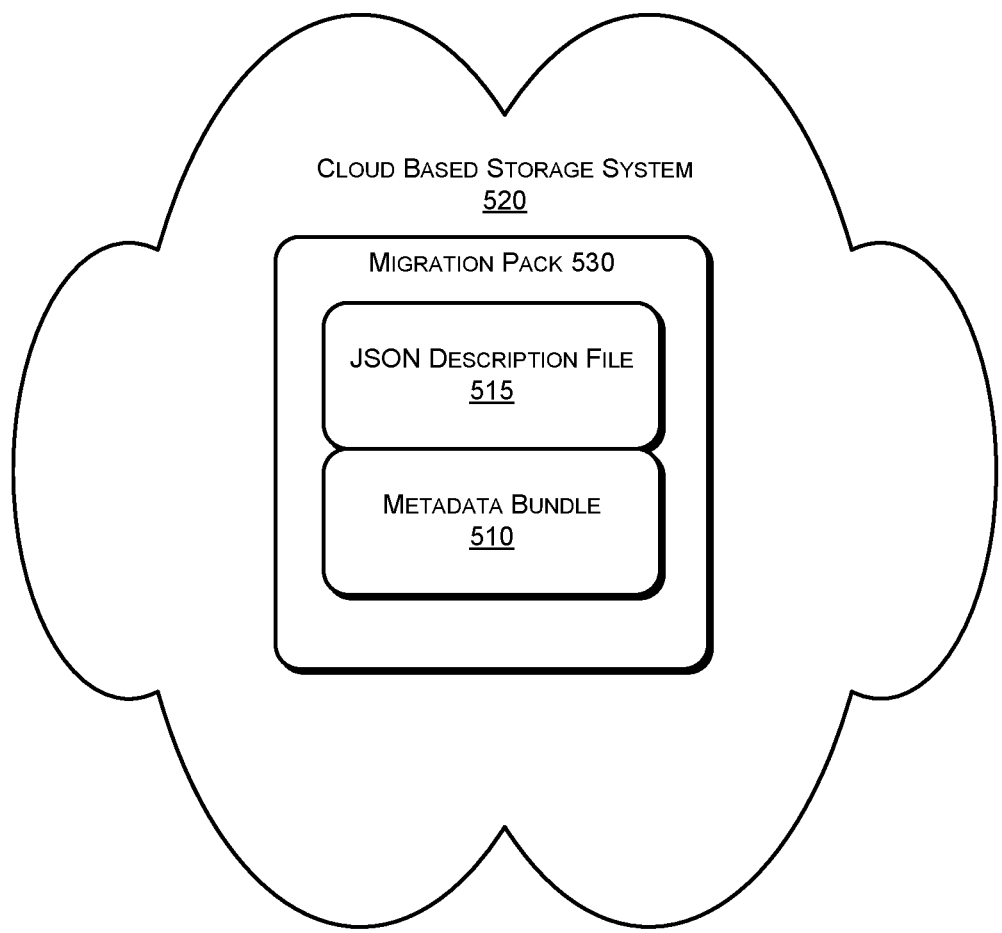

In other examples illustrated with reference to FIGS. 4-8, various metadata components may be bundled with a JavaScript Object Notation (JSON) file. FIG. 4 is a schematic illustration of a processing environment in which systems and methods for secure data transfer between entities in a multi-user on-demand computing system according to embodiments. Referring first to FIGS. 4-6, at operation 410 metadata is extracted from an origin organization 210 resulting in a metadata component bundle 510. At operation 415 the information and records from sObjects referenced in the metadata component bundle 510 are parsed. In some examples, each sObject definition may comprise the name of the sObject (e.g., an API name), one or more fields (e.g., API field names), a list of records, a list of record types (e.g., identifier and developer name), and any references or relationships (e.g., dependencies) associated with the sObject.

At operation 420 the data from the sObject list compiled in operation 415 is extracted. In some examples an empty array is created and the sObject definitions are analyzed in an iterative process. If an sObject does not have any relationships (i.e., dependencies) with other sObjects or if the other sObject(s) with which the sObject has a relationship are already in the array then the sObject may be added directly onto the array. By contrast, if an sObject has relationships (i.e., dependencies) with other sObjects or if the other sObject(s) with which the sObject has a relationship are already in the array then the process continues to iterate through the other sObjects. The result of the iterative process is an array of sObjects which is ordered by dependencies, i.e., objects with lower dependencies precede objects with higher dependency. Standard sObjects may be placed on the top of the array and associated with standard dependencies.

At operation 425 the array constructed in operation 420 is written to a JSON file 515, and at operation 430 the JSON file 515 is associated with the metadata bundle 515 and at operation 530 the metadata bundle 515 and the JSON file 510 are stored as a migration pack 530 in a cloud based storage system 520. One example of a JSON file is presented in FIG. 6.

Figure 7:
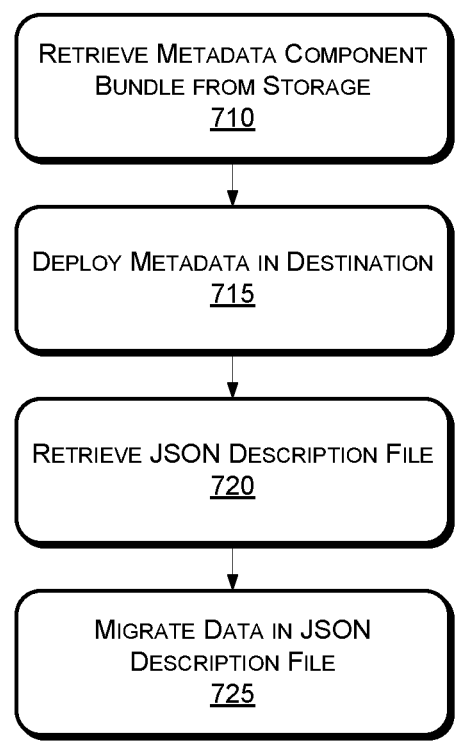
FIG. 7 is a flow diagram which illustrates operations in a method for secure data transfer between entities in a multi-user on-demand computing system according to embodiments.

Referring to FIG. 7, during the migration process the metadata components bundle 510 is retrieved (operation 710) from the migration pack 530 in the cloud based storage system 520 and deployed (operation 715) in a destination organization 525, which may also reside in the cloud-based storage system. At operation 720 the JSON description file 515 is retrieved from the migration pack 530 and at operation 725 the data in the JSON description file 515 is migrated to the destination organization 525. In some examples the object record is recreated one at a time starting at the top level of the array that was written to the JSON file. During the object migration, a map of object identifiers may be created using a key/value pair, where the key represents the identifier associated with an object in the origin organization and the value represents the identifier associated with the object in the destination organization. Thus, once an object is migrated, all iterations of the identifier associated with an object in the origin organization are replaced with the identifier associated with the object in the destination organization. This preserves a proper relationship identifier when objects are being migrated.

Figure 8:
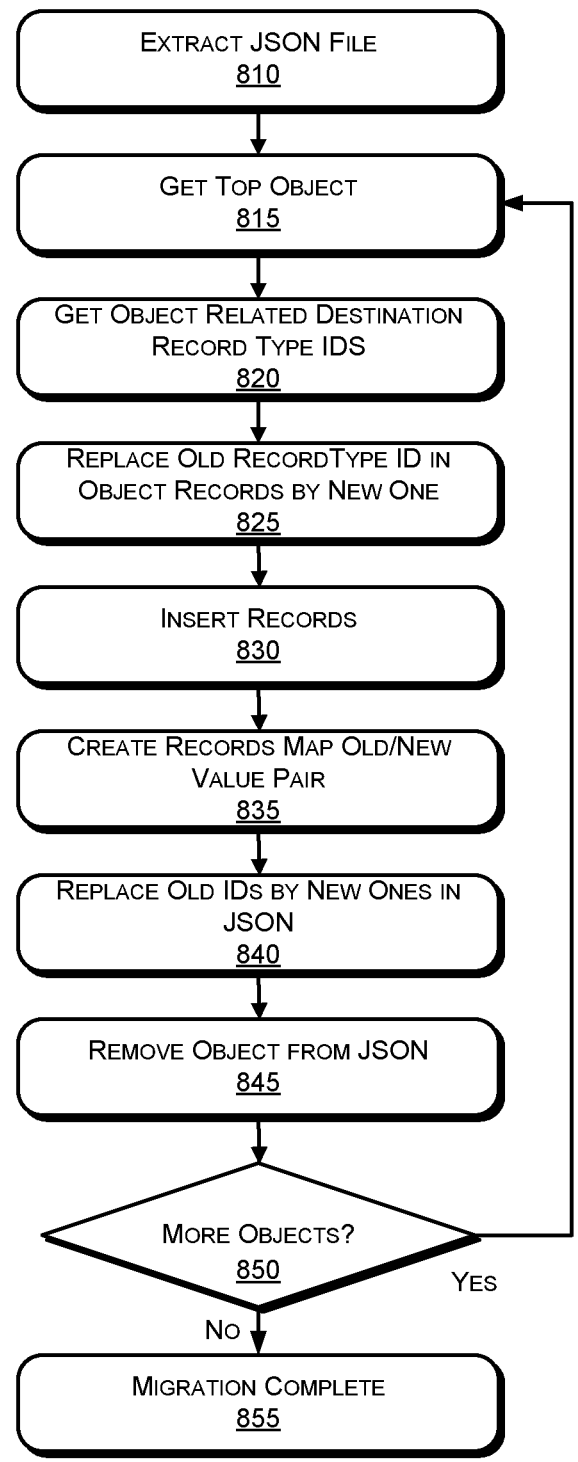
FIG. 8 is a flow diagram which illustrates operations in a method for secure data transfer between entities in a multi-user on-demand computing system according to embodiments.

FIG. 8 illustrates the aspects of the migration process in greater detail. Referring to FIG. 8, at operation 810 the JSON file is extracted from the migration pack 530. At operation 815 the top object in the JSON file is retrieved, and at operation 820 the related destination record type identifier(s) for the object retrieved in operation 815 are retrieved from the JSON file. At operation 825 the record type identifier(s) obtained in operation 820 are replaced with new identifier(s), and at operation 830 the record(s) are inserted into the JSON file.

At operation 835 a records map that maps the old identifiers (i.e., keys) associated with the object to the new identifiers (i.e., values) is created, and at operation 840 the old identifiers (i.e., keys) in the JSON file are replaced with the new identifiers (i.e., values). At operation 845 the object is removed from the JSON file.

If, at operation 850 there are more objects in the JSON file then control passes back to operation 815 and the object which is now on top of the JSON file is retrieved. Thus, operations 815 through 850 define a loop pursuant to which the JSON file is unpacked at the destination organization. By contrast, if at operation 850 there are no more objects remaining in the JSON file then control passes to operation 855 and the migration process is complete.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 9:
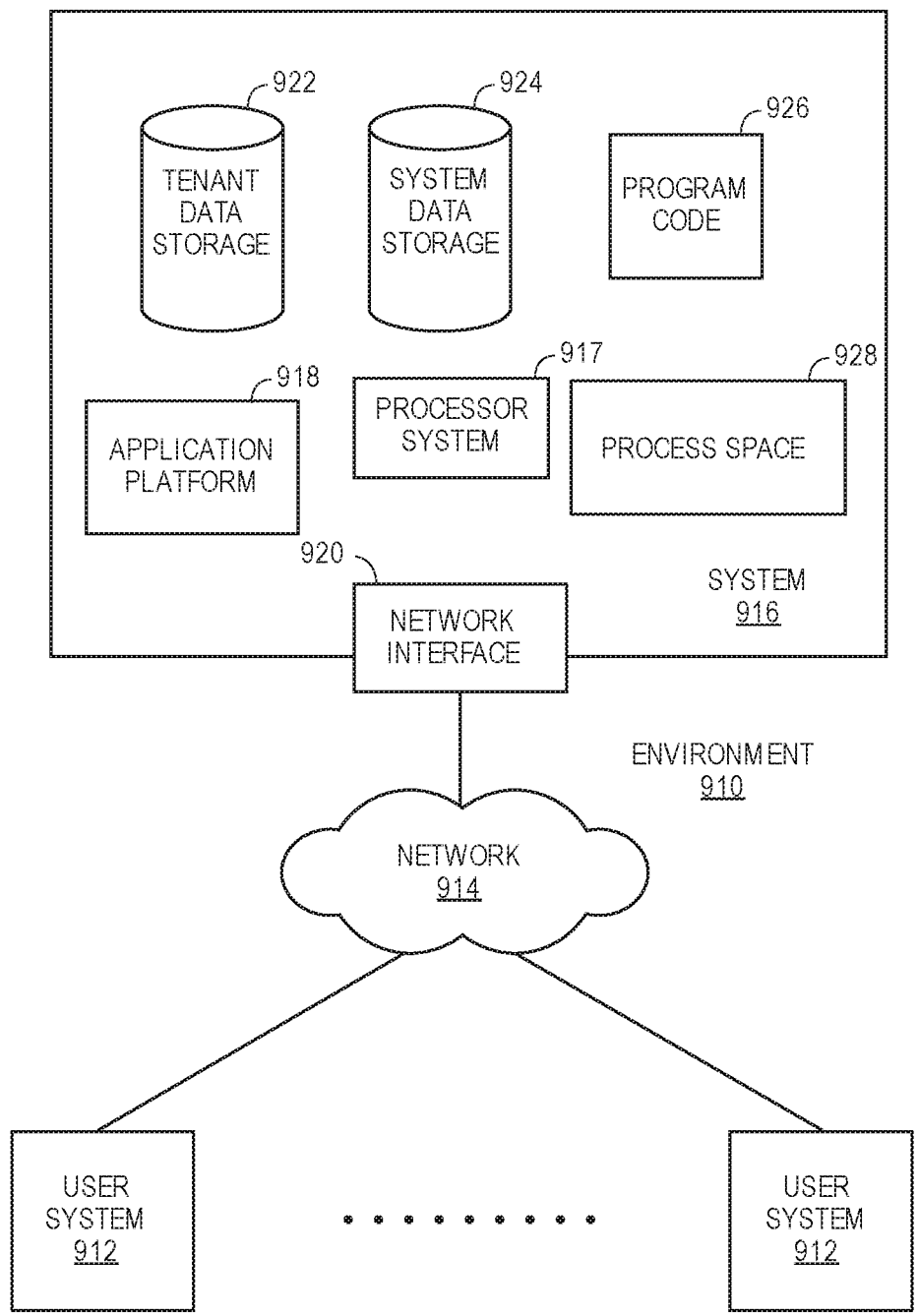
FIG. 9 is a schematic illustration of a processing environment in which systems and methods for secure data transfer between entities in a multi-user on-demand computing system according to embodiments.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in herein FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Core series processor or the like. Similarly, system 916 (and additional instances of an MTS, where more than one is present) and all of their components might be operator configurable using application(s) including computer code to run using a central processing unit such as processor system 917, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
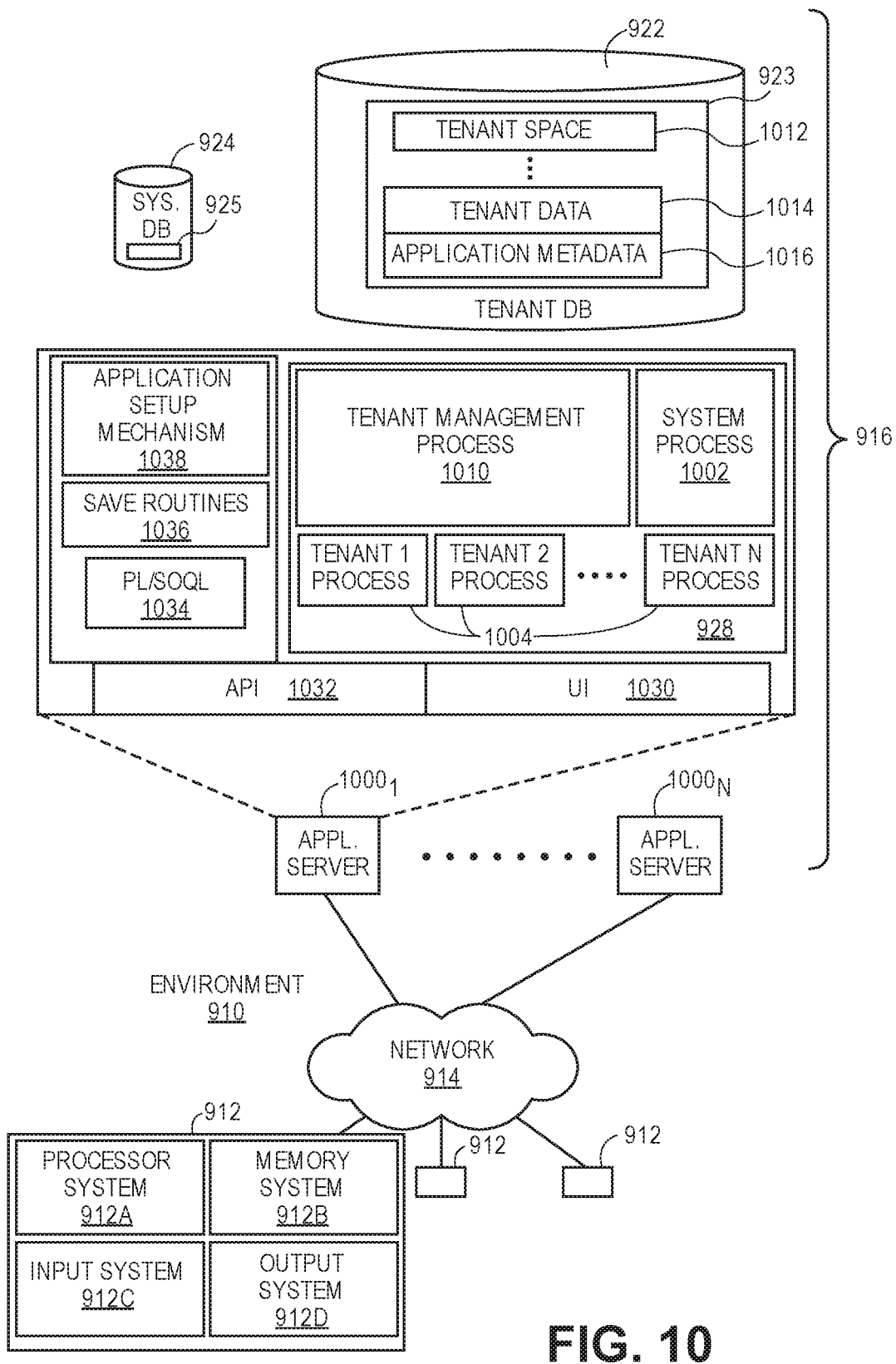
FIG. 10 is a schematic illustration of a processing environment in which systems and methods for secure data transfer between entities in a multi-user on-demand computing system according to embodiments.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 BIG-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers. Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. An electronic device configured to implement secure data transfer between entities in a multi-user, on-demand computing environment, comprising:
   at least one physical memory device capable to store one or more multi-user on-demand databases;
   one or more processors coupled with the at least one physical memory device, the one or more processors configured to:
      create a scratch organization within the multi-user, on-demand computing environment, wherein the scratch organization is a proxy for metadata deployment for the multi-user, on-demand computing environment;
      receive, via a user interface and based on user permissions, a metadata selection from a user comprising a plurality of metadata resources that define a set of components for a service implemented in an origin organization of the multi-user, on-demand computing environment;
      extract the plurality of metadata resources from the origin organization within the computing environment into a metadata bundle, wherein data objects referenced in the metadata bundle are iteratively analyzed in an empty array for relationships and dependencies with other data objects in the metadata bundle;
      deploy the metadata bundle in the scratch organization;
      determine whether the metadata bundle was deployed successfully in the scratch organization; and
      in response to a determination that the metadata bundle was deployed successfully, designate the metadata bundle as valid and delete the scratch organization.

2. The electronic device of claim 1, wherein the one or more processors are configurable to:
   determine whether the metadata bundle was deployed successfully in the scratch organization; and
   in response to a determination that the metadata bundle was not deployed successfully, to present the metadata bundle on the user interface for review.

3. The electronic device of claim 2, wherein the metadata resources comprise at least one executable file, and wherein the one or more processors are to execute the at least one executable file in order to determine whether the metadata bundle was deployed successfully in the scratch organization.

4. The electronic device of claim 1, wherein the metadata resources comprise at least one executable file, and wherein the one or more processors are to execute the at least one executable file in order to determine whether the metadata bundle was deployed successfully in the scratch organization.

5. The electronic device of claim 1, wherein the scratch organization is generated in a development huh organization.

6. A non-transitory computer-readable medium having stored thereon instructions that, when executed by one or more processors, are configurable to cause the one or more processors to:
   create a scratch organization within a multi-user, on-demand computing environment, wherein the scratch organization is a proxy for metadata deployment for the multi-user, on-demand computing environment;
   receive, via a user interface and based on user permissions, a metadata selection from a user comprising a plurality of metadata resources that define a set of components for a service implemented in an origin organization of the multi-user, on-demand computing environment;
   extract the plurality of metadata resources from the origin organization within the computing environment into a metadata bundle, wherein data objects referenced in the metadata bundle are iteratively analyzed in an empty array for relationships and dependencies with other data objects in the metadata bundle;
   deploy the metadata bundle in the scratch organization;
   determine whether the metadata bundle was deployed successfully in the scratch organization; and
   in response to a determination that the metadata bundle was deployed successfully, designate the metadata bundle as valid and delete the scratch organization.

7. The non-transitory computer-readable medium of claim 6, further comprising instructions that, when executed by the one or more processors, are configurable to cause the one or more processors to:
   determine whether the metadata bundle was deployed successfully in the scratch organization; and
   in response to a determination that the metadata bundle was not deployed successfully, to present the metadata bundle on the user interface for review.

8. The non-transitory computer-readable medium of claim 7, wherein the metadata resources comprise at least one executable file, and wherein the one or more processors are to execute the at least one executable file in order to determine whether the metadata bundle was deployed successfully in the scratch organization.

9. The non-transitory computer-readable medium of claim 6, wherein the metadata resources comprise at least one executable file, and wherein the one or more processors are to execute the at least one executable file in order to determine whether the metadata bundle was deployed successfully in the scratch organization.

10. The non-transitory computer-readable medium of claim 6, wherein the metadata resources comprise at least one executable file, wherein the scratch organization is generated in a development hub organization.

11. A method to implement secure data transfer between entities in a multi-user, on-demand computing environment:
creating a scratch organization within the multi-user, on-demand computing environment, wherein the scratch organization is a proxy for metadata deployment for the multi-user, on-demand computing environment;
receiving, via a user interface and based on user permissions, a metadata selection from a user comprising a plurality of metadata resources that define a set of components for a service implemented in an origin organization of the multi-user, on-demand computing environment;
extracting the plurality of metadata resources from the origin organization within the computing environment into a metadata bundle, wherein data objects referenced in the metadata bundle are iteratively analyzed in an empty array for relationships and dependencies with other data objects in the metadata bundle;
deploying the metadata bundle in the scratch organization;
determining whether the metadata bundle was deployed successfully in the scratch organization; and
in response to a determination that the metadata bundle was deployed successfully, designating the metadata bundle as valid and deleting the scratch organization.

12. The method of claim 11, further comprising:
determining whether the metadata bundle was deployed successfully in the scratch organization; and
in response to a determination that the metadata bundle was not deployed successfully, presenting the metadata bundle on the user interface for review.

13. The method of claim 12, wherein the metadata resources comprise at least one executable file, and wherein the one or more processors are to execute the at least one executable file in order to determine whether the metadata bundle was deployed successfully in the scratch organization.

14. The method of claim 11, wherein the metadata resources comprise at least one executable file, and wherein the one or more processors are to execute the at least one executable file in order to determine whether the metadata bundle was deployed successfully in the scratch organization.

15. The method of claim 11, wherein the metadata resources comprise at least one executable file, wherein the scratch organization is generated in a development hub organization.

* * * * *